United States Patent

Shah et al.

Patent Number: 5,464,952
Date of Patent: Nov. 7, 1995

[54] SHIELD BETWEEN VEHICLE EXHAUST AND PASSENGER COMPARTMENT

[75] Inventors: Hiten T. Shah, Delaware; Jerry M. Wolf, Westerville, both of Ohio

[73] Assignee: Acoust-A-Fiber Research and Development Inc., Delaware, Ohio

[21] Appl. No.: 409,956

[22] Filed: Mar. 23, 1995

Related U.S. Application Data

[63] Continuation of Ser. No. 157,445, Nov. 26, 1993, abandoned.

[51] Int. Cl.⁶ .............................. F01N 5/00; B60K 13/04
[52] U.S. Cl. ........................................... 181/211; 180/89.2
[58] Field of Search .................................. 181/211, 227, 181/228, 232, 240, 252, 256, 283, 290; 180/89.2, 309

[56] References Cited

U.S. PATENT DOCUMENTS

| | | | |
|---|---|---|---|
| 3,237,716 | 3/1966 | Parsons | 181/232 |
| 3,491,849 | 1/1970 | Newkirk | 181/240 |
| 3,677,365 | 7/1972 | Wright et al. | 181/232 |
| 3,698,440 | 10/1972 | Matthieu et al. | 138/149 |
| 4,315,558 | 2/1982 | Katayama | 181/227 |
| 4,349,078 | 9/1982 | Shimada et al. | 180/89.2 |
| 4,487,289 | 12/1984 | Kicinski et al. | 181/283 |
| 4,993,512 | 2/1991 | Lescher | 181/227 |
| 5,196,253 | 3/1993 | Mueller et al. | 181/211 |

*Primary Examiner*—Khanh Dang
*Attorney, Agent, or Firm*—Sidney W. Millard

[57] ABSTRACT

A shield for mounting on a vehicle intermediate the passenger compartment and the exhaust system is formed as a sandwich of a fibrous layer between two heat reflecting layers. During the manufacturing process a hardenable resin impregnates the periphery of the fibrous layer and hardens in place to serve as an adhesive for bonding the layers together and providing a hard rigid mounting bracket. The fibrous layer intermediate its peripheral edges is relatively loosely held in place to serve as a sound absorbing barrier.

10 Claims, 3 Drawing Sheets

SHIELD BETWEEN VEHICLE EXHAUST AND PASSENGER COMPARTMENT

This is a continuation of U.S. application No. 08/157,445, filed Nov. 23, 1993, now abandoned.

FIELD OF THE INVENTION

This invention relates to a generally U-shaped shield bolted to the underside of a vehicle intermediate the passenger compartment and the exhaust system to shield the passenger compartment from heat and sound.

BACKGROUND OF THE INVENTION

Exhaust systems in modern vehicles are configured to fit relatively close to the passenger compartment of a vehicle and in many cases bisect the car body from front to rear resulting in a hump extending the length of the passenger compartment. The passenger compartment side of the hump is carpeted with decorative material. Because of the close proximity of the exhaust system to the carpeting, the heat of the exhaust system tends to cook, discolor and eventually destroy the carpet near to the hump unless a shield is applied to the vehicle intermediate the carpet and the exhaust system.

U.S. Pat. No. 3,677,365 discloses a shield system mounted to the underside of a vehicle where the shield system completely surrounds the exhaust system. One of the objects of the 1972 patent is to retain heat in the exhaust system.

U.S. Pat. No. 3,698,440 discloses an insulation system to completely surround a conduit transporting hot liquid or gaseous material. The system includes a plurality of layers, namely, a heat insulating material of rigid polyurethane foam between a pair of corrugated metal sheaths.

U.S. Pat. No. 4,315,558 discloses an exhaust system having a mesh shield around a longitudinally expandable exhaust system. The exhaust system is mounted to the body of the vehicle by a series of springs placed along its length.

U.S. Pat. No. 4,993,512 discloses a vehicle exhaust system confined within a casing which casing is mounted to the vehicle body. The casing completely encloses the exhaust system to retain heat.

SUMMARY OF THE INVENTION

This invention incorporates a light weight shield which is designed to be mounted on the underside of a vehicle body intermediate the passenger compartment and the exhaust system. Its function is to shield the passenger compartment from the heat of the exhaust system and to shield the passenger compartment from the road noise and the noise of the exhaust system itself.

To minimize heat transfer between the exhaust and the car body, the shield is mounted such that it is out of contact with the car body and the exhaust system leaving an air space therebetween except for the limited areas where the edges of the shield are bolted to the car body.

The shield is formed of three layers including two heat reflecting layers having a fibrous layer sandwiched therebetween. A strip of hardened resin adhesive impregnates the peripheral edges of the fibrous layer to bond it with the two heat reflecting layers. After the strip of adhesive hardens its serves to hold the shield in its desired shape but because it is rigid only along the periphery, the shield itself is quite flexible to accommodate heat expansion and contraction and road flexing by the vehicle during its operation.

The formed shield is generally U-shaped in configuration having sidewardly projecting ears which are slotted to receive studs for mounting the shield on the vehicle body.

Conventional modern vehicle bodies include a hump or ridge extending longitudinally from front to back in the passenger compartment. The vehicle body, external of the passenger compartment, includes a generally U-shaped cavity extending from front to back which causes the aforementioned ridge. The longitudinal cavity is designed to accommodate the exhaust system. The shield of this invention is secured to the vehicle body and is of a general shape to extend over the exhaust system in the cavity area intermediate the exhaust system and the passenger compartment and so configured as to be out of contact with the vehicle body and the exhaust system except for the peripheral edges which are mechanically secured to the car body.

Objects of the invention not understood from the above description will be fully appreciated upon a review of the drawings and the description of the preferred embodiment which follows.

DESCRIPTION OF THE PREFERRED EMBODIMENT

Figure 1:
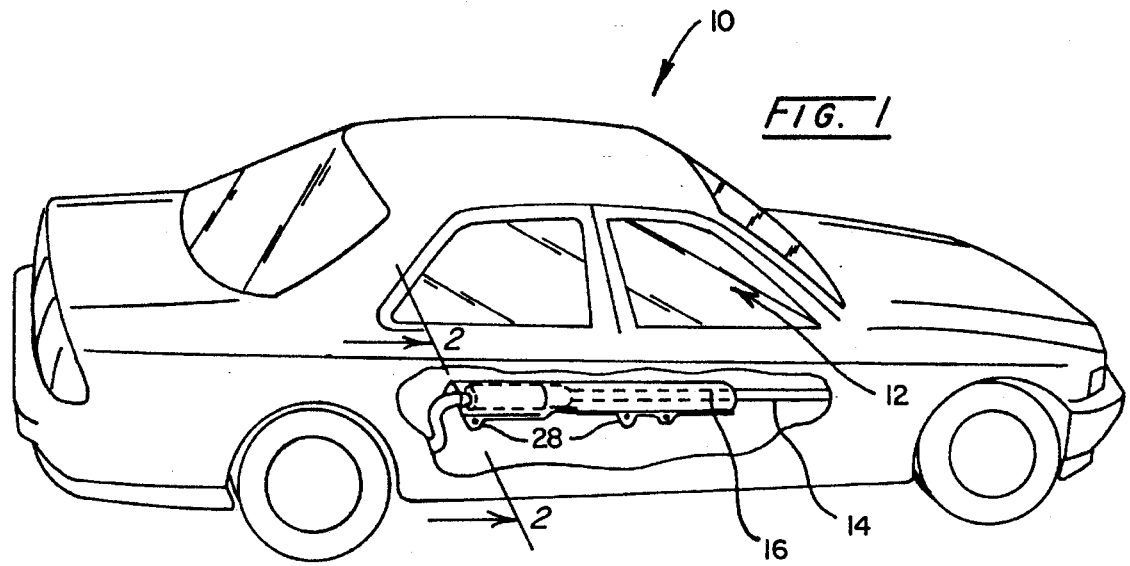
FIG. 1 is a perspective view of a passenger vehicle, partially broken away to illustrate the general location and configuration of the shield of this invention.

FIG. 1 illustrates a conventional vehicle 10 having a passenger compartment 12 and illustrating an exhaust system 14 partially covered by the heat and sound shield 16 of this invention, generally in the location for most conventional passenger vehicles.

Figure 2:
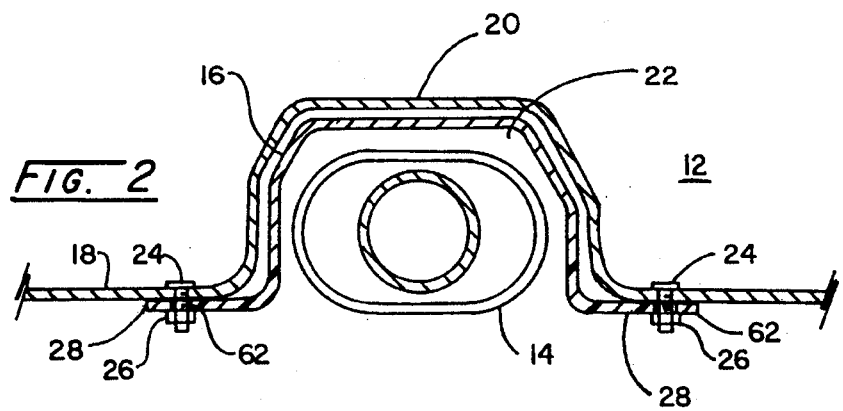
FIG. 2 is a fragmentary sectional view taken along line 2—2 of FIG. 1.

The vehicle body 18, as best seen in FIG. 2, includes a ridge 20 projecting into the passenger compartment 12 and generally bisecting the compartment from front to back. The upwardly projecting ridge is normally covered by a decorative carpeting (not shown) which is susceptible to degradation from prolonged heat exposure. Such heat exposure may result from the heat of the exhaust system being transmitted by convection and radiation to body 18. The exhaust system 14 is conventionally mounted in the cavity 22 which is formed for that purpose. Accordingly, the exhaust system is in close proximity to the metallic car body 18.

To shield the passenger compartment 12 from the heat of the exhaust system 14 and to assist in shielding the passenger compartment from road and exhaust system noise, the shield 16 of this invention is shown to be mechanically secured by bolts 24 and nuts 26 to the vehicle body 18. Any other mechanical securing means would be satisfactory.

Note that the shield is spaced from both the ridge 20 and the exhaust system 14 to provide two dead air spaces which minimizes the transmission of both heat and sound to the passenger compartment 12. The only contact of the U-shaped shield 16 with the car body is where the wings or flanges 28 are bolted to the vehicle body 18. The two dead spaces assist in the deadening of sound and minimizing of heat transfer and combined with the composite sandwich structure of the shield 16 itself provides longer life for the carpeting bridging the ridge 20 and minimizes heat and noise inside compartment 12.

Figure 8:
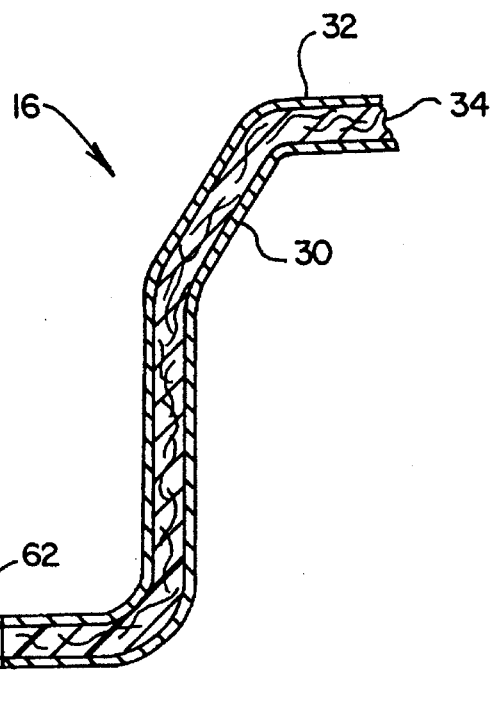
FIG. 8 is a fragmentary sectional view of the shield following the trimming and slot forming operations of FIG. 7.

Shield 16 is a composite sandwich of two layers of heat reflective material 30, 32, best seen in FIG. 8, sandwiching therebetween a fibrous layer 34.

For purposes of this invention the heat reflective layers 30, 32 may be selected from aluminum foil, steel foil, and polypropylene-Kraft paper laminate. The preferred material for the heat reflective layer is a triple-ply laminate of aluminum foil, scrim, and a fire retardant thermoplastic film. The fire retardant film is preferably a white polyolefin and the scrim is fiberglass. The aluminum foil is about 0.0007 inch thick. The preferred triple-ply laminate is purchased from Alpha Associates, Inc. with the trade designation Alpha Style AMF-44 or Alpha Alaflex Style No. 4313.

The fibrous layer is a bat of fiberglass, ceramic fibers, basalt wool or mixtures thereof.

In the process of manufacturing the shield, a pair of molds are provided which are generally mirror images of each other. One mold has a cavity and the other has a projection.

Figure 4:
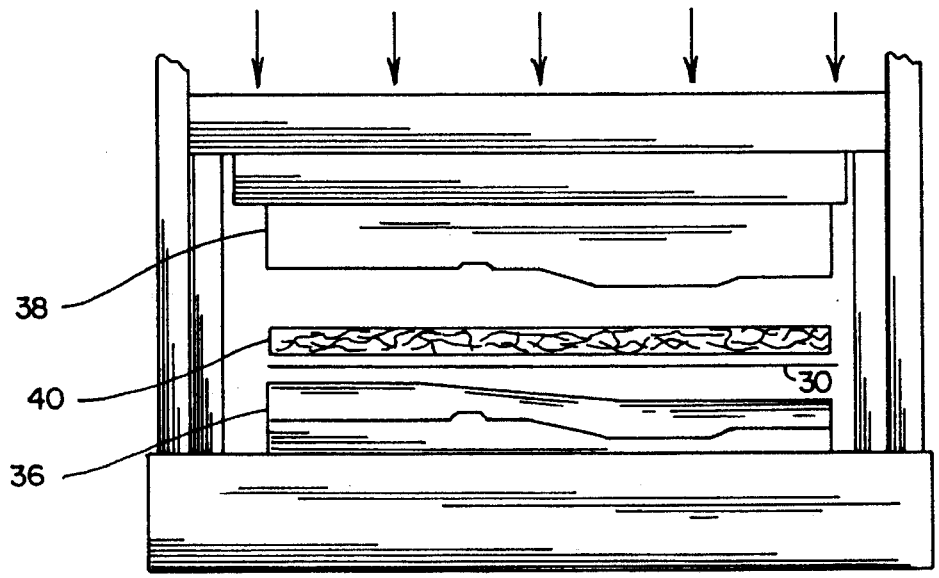
FIG. 4 is a side elevational view of the mold configuration and the layers of the shield which make up the preform in the process steps of this invention.

In the preferred molding apparatus, the projection half of the mold 36, best seen in FIG. 4, faces upward. To begin the process both the projection portion of the mold 36 and the cavity portion of the mold 38 are heated to a temperature in the range of about 300°–425° F. Then a mold release material, not shown, is applied to the surface of mold 36 prior to the placement of lower heat reflective material 30 and a bat of fibrous material 40. Prior to the time the upper-cavity portion 38 of the mold pair descends, a second layer of mold release material is applied between fibrous bat 40 and upper cavity mold 38.

The means for applying the mold release layers in the process is susceptible of various techniques known in the industry. The preferred embodiment uses a pair of polytetrafluoroethylene sheets which are reusable after upper mold 38 descends to compress and set the formaldehyde resin incorporated into fibrous bat 40 to make the preform 42 illustrated in FIG. 5. Purchase of fibrous bats having the thermo-setting adhesive incorporated therein is conventional in the industry and need not be discussed in detail.

After the descent of the upper mold 38 to cover the two layers 30 and 40 and heating the same for a period of 45–120 seconds at the temperature range of 300°–425° F., the upper mold 38 is retracted and the preform 42 rises with the upper mold 38. It may be manually pulled loose quite easily for deposit on a fixture, not shown, having the same general shape as the preform 42 of FIG. 5.

The reason the preform 42 rises with the upper mold 38 is that the upper mold is at a molding temperature of about 10°–20° F. greater than the mold temperature of lower mold 36.

After the first molding step, the preform 42 is deposited on a fixture and a two part thermo-setting or epoxy hardenable resin adhesive is applied by a nozzle 44 in a strip about one inch wide completely around the periphery of the preform 42. At this stage the fibrous bat is somewhat compressed from its original stage prior to the first molding step, but it is still somewhat loose and porous so it easily accommodates the resin mixture 46. The resin mixture will harden in place at room temperature, but will harden more quickly in the second molding step to be described subsequently.

Figure 5:
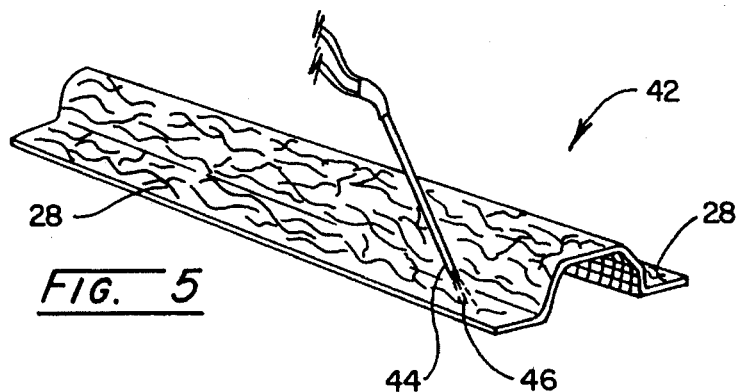
FIG. 5 is a perspective view which illustrates the molded preform from FIG. 4, schematically showing the application of a hardenable resin adhesive applied at the periphery of the preform.
Figure 6:
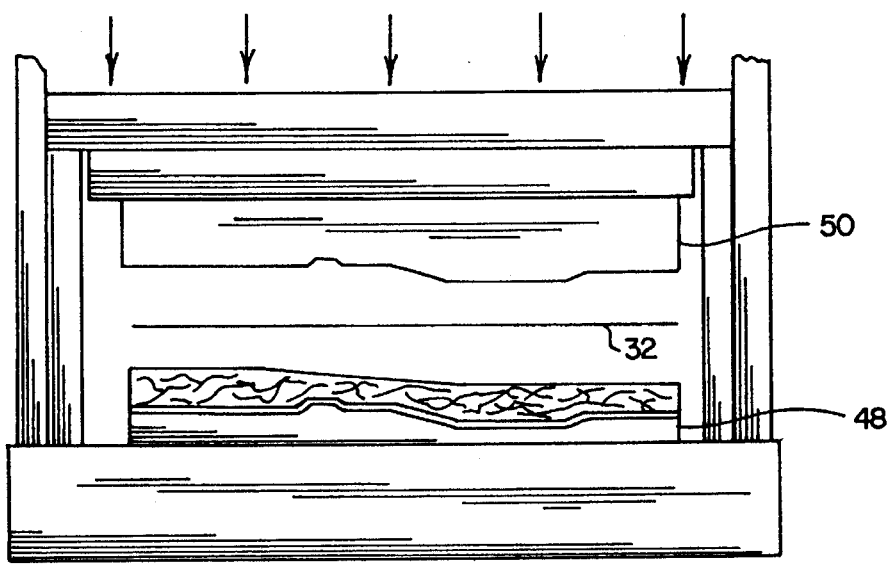
FIG. 6 is a side elevational view of the molding apparatus for applying a second heat reflecting layer to the preform of FIG. 5 after the hardenable resin is applied about the periphery of the preform.

After the strip of resin 46 is applied around the periphery of preform 42, the preform is placed over a convex molding tool 48 having generally the same shape as lower mold 36. As in the first molding step, a mold release layer is placed on convex tool 48 prior to placing the preform 42 in place. Thereafter, a second layer of heat reflective material 32 is applied over the fibrous layer 34 and on top of that is another mold release layer. Then the upper or concave molding tool 50 descends to press the second heat reflective layer 32 against the preform to effect the last bonding procedure. In this last illustrated pressing step by concave molding tool 50 the spacing between the surfaces of tools 48 and 50 is less than the spacing between the pair of molds 36, 38 because the pressing step of FIG. 6 is intended to form the shield into its final configuration having the general U-shape illustrated in FIG. 3. On the other hand, the preform 42 of FIG. 5 is not so compressed that the voids in the fibrous layer 34 will not readily accommodate the resin mixture 46.

Prior to the time molding tools 48 and 50 are clamped together for the final molding step, they are heated to a temperature in the range 350°–500° F. and most preferably to a temperature 25° F. or so hotter than the pair of molding tools 36, 38 of FIG. 4. After about 1½–2½ minutes at that temperature, again the upper mold 50 being 10°–20° F. hotter than the lower mold 46, the final molded structure of the shield is removed from concave molding tool 50 and allowed to cool briefly before it is placed in a trimming fixture 52, illustrated in section in FIG. 7. Trimming fixture 52 includes a lower fixture 54 having the same general configuration of the U-shaped shield which is mounted in place to receive a descending upper fixture 56 which clamps the side wings 28 of the shield in place. As the upper fixture 56 descends it severs or trims the edges of the side wings 28 as integral knives or blades 58 penetrate accommodating grooves 60.

Figure 3:
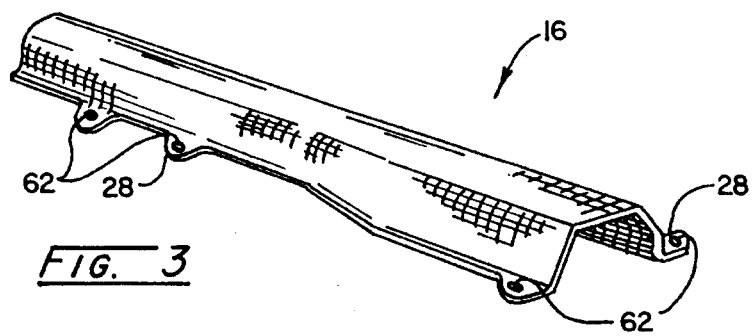
FIG. 3 is a perspective view of the shield of this invention.
Figure 7:
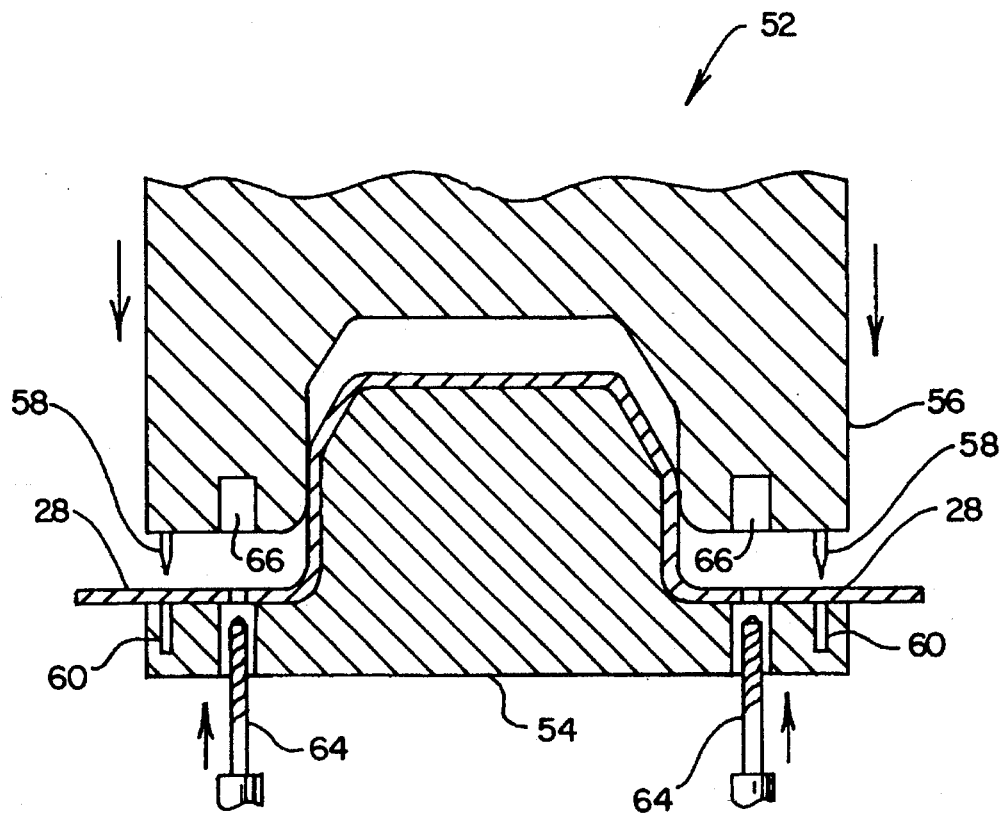
FIG. 7 is a fragmentary sectional view of a cutting apparatus for trimming the edges of the shield from FIG. 6 to the desired shape and the apparatus for forming slots in the hardened edges of the shield.

The blades 58 and grooves 60 appear to be linear as illustrated in FIG. 7 but in fact they define a shape or pattern conforming to the shape illustrated for the periphery of the shield in FIG. 3.

After the severing of the edges of the shield and while fixtures 54 and 56 confine shield 16 in place, a plurality of elongated slots 62 are formed in flanges 28 by suitable tools 64 which rise to penetrate the appropriate areas of severed flanges 28. Suitable voids 66 are formed in upper fixture 56 to accommodate slot forming tools 64. The resulting elongated slot shape partially illustrated in FIG. 8 is then suitable for mounting on the underside of a vehicle body somewhat as illustrated in FIG. 1.

It will be necessary in at least some instances to protect the exposed fibers at the edge 68 of the shield due to the 400° F. temperatures that are encountered in normal vehicle operation. Accordingly, an edge coat of neoprene latex compound is applied over the exposed edges after the trimming step and after the shield is removed from fixture 54.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

We claim:

1. A shield for securing to a vehicle intermediate the passenger area and the exhaust system comprising, a pair of heat reflective layers sandwiching a sound deadening loose fibrous layer therebetween, said layers being formed in a generally U-shaped trough having two ends and two sides, said trough being configured to extend along the length of said exhaust system with the open end of the U-shape facing the exhaust system, a hardened resin adhesive impregnating the periphery of said fibrous layer and bonding it to said heat reflective layers along said ends and said sides to provide a hard periphery for said shield, in the sandwich inside said periphery and between said heat reflective layers said fibrous layer partially filling a space to create a void for absorbing sound from said exhaust system and road noises.

2. The shield of claim 1 wherein said hard periphery and loose fiber interior combine to provide a means for firmly securing said shield to said vehicle frame and spaced from said exhaust system while allowing said shield to flex with the vehicle frame without cracking due to excess rigidity.

3. The shield of claim 2 including elongated slots in said hard periphery to receive mounting studs for locating said shield on said vehicle, said elongated slots serving to accommodate variations in the location of said mounting studs.

4. The shield of claim 3 wherein said heat reflective layers are selected from the group consisting of aluminum foil, steel foil and polypropylene-Kraft paper laminate.

5. The shield of claim 4 wherein said fibrous layer is comprised of fibers selected from the group consisting of fiberglass, ceramic fibers, basalt wool and mixtures thereof.

6. The shield of claim 1 including elongated slots in said hard periphery to receive mounting studs for locating said shield on said vehicle, said elongated slots serving to accommodate variations in the location of said mounting studs.

7. The shield of claim 1 wherein said heat reflective layers are selected from the group consisting of aluminum foil, steel foil and polypropylene-Kraft paper laminate.

8. The shield of claim 1 wherein said fibrous layer is comprised of fibers selected from the group consisting of fiberglass, ceramic fibers, basalt wool and mixtures thereof.

9. In combination, a vehicle body with a passenger compartment, an exhaust system located in close proximity to said compartment and a shield mounted on said body intermediate said exhaust system and said compartment, said compartment including a ridge along its length, said ridge being formed to accommodate said exhaust system in the longitudinally extending cavity comprising the shape of the ridge outside the compartment, said shield having its edges mechanically secured to said body along said cavity, said shield having a general U-shape with the open end of the U facing the exhaust system and the closed end of the U projecting into said cavity, said shield being spaced from both said body and said exhaust system except for the edges mechanically secured to said body, said shield including a layer of heat reflecting material facing said shield, said heat reflecting layer being bonded to a fibrous layer by a rigid strip of resin impregnating said fibrous layer only at its periphery, and said fibrous layer being relatively loose to serve as both a heat barrier and a sound absorber intermediate its resin impregnated peripheral edges.

10. The combination of claim 9 including a second heat reflecting layer secured to said fibrous layer, said second reflecting layer being located nearest to said body.

* * * * *